[11] 3,601,473

[72] Inventors Walter Mandler;
 Garry Edwards; Erich Wagner, all of
 Midland, Ontario, Canada
[21] Appl. No. 28,339
[22] Filed Apr. 14, 1970
[45] Patented Aug. 24, 1971
[73] Assignee Ernst Leitz G.m.b.H.
 Wetzlar, Germany
[32] Priority Apr. 26, 1969
[33] Germany
[31] P 19 21 418.7
 Continuation-in-part of application Ser. No. 833,063, June 13, 1969.

[54] OBJECTIVE HAVING LONG BACK FOCAL DISTANCE WITH REGARD TO ITS FOCAL LENGTH
 1 Claim, 1 Drawing Fig.

[52] U.S. Cl. .................................................. 350/215, 350/210
[51] Int. Cl. ........................................... G02b 9/62
[50] Field of Search ............................... 350/209, 214, 215, 225, 210

[56] References Cited
UNITED STATES PATENTS
3,132,199  5/1964  Zimmermann et al. ........ 350/214

*Primary Examiner*—David Schonberg
*Assistant Examiner*—Paul A. Sacher
*Attorney*—Krafft & Wells ABSTRACT: A photographic objective having a relatively long back focal distance with regard to its focal length and also having a great relative opening. The objective comprises in front of the diaphragm a negative lens element consisting of two component lenses and spaced therefrom a cemented positive lens element which consists also of two component lenses. The latter lenses have inverse refractive power. Behind the diaphragm a negative lens element is disposed which consists of three component lenses of which the middle one is a cemented lens.

PATENTED AUG24 1971 3,601,473
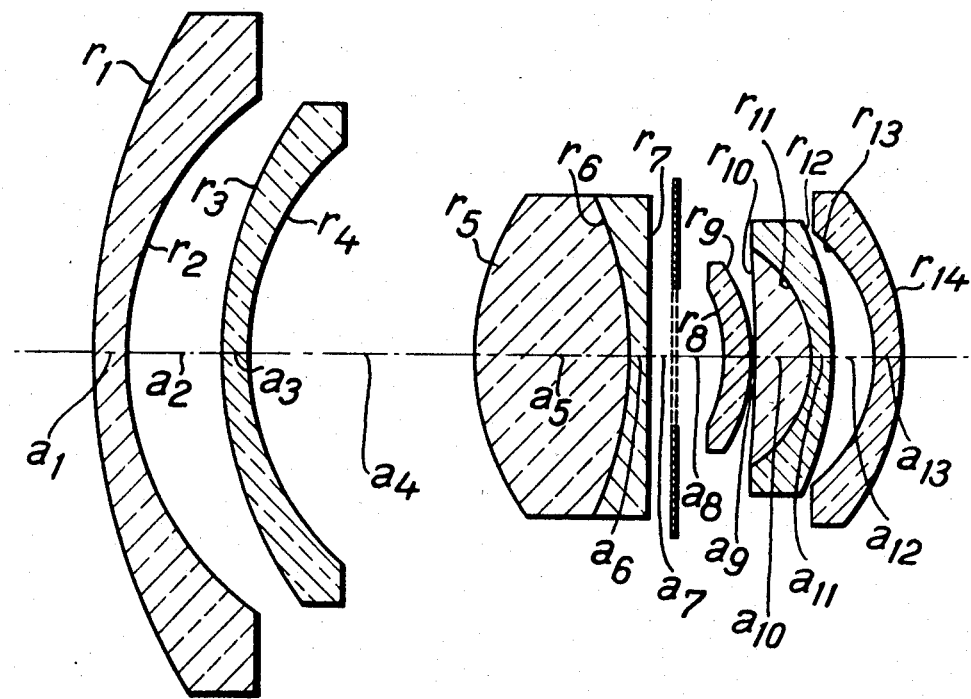
WALTER MANDLER
GARRY EDWARDS
ERICH WAGNER
    INVENTORS
BY Krafft + Wells

OBJECTIVE HAVING LONG BACK FOCAL DISTANCE WITH REGARD TO ITS FOCAL LENGTH

CROSS-REFERENCE TO RELATED APPLICATIONS

This application is a continuation-in-part of Ser. No. 833,063, filed June 13, 1969 for which priority under 35 USC 119 was claimed for application Ser. No. P 17 72 665.7 filed in the Patent Office of the Federal Republic of Germany on June 15, 1968. Priority under 35 USC 119 is claimed in the present application for application Ser. No. P 19 21 418.7 filed in the Patent Office of the Federal Republic of Germany on Apr. 26, 1969.

BACKGROUND OF THE INVENTION

The field of the present invention is photographic objectives. The invention is particularly concerned with wide-angle objectives having a long back focal distance and a great relative opening.

It is well known in the art that the use of wide-angle objectives in combination with many apparatuses and devices is facilitated to a considerable degree if the objectives do have a rather long back focal distance.

Copending application Ser. No. 833,063 filed June 13, 1969, of which this application is a continuation-in-part, describes a type of objectives which has the required long back focal distance and which also has a great relative opening. These objectives comprise a negative lens element in front of the diaphragm and a positive lens element spaced therefrom. Behind the diaphragm a negative lens element is disposed. The lens elements may consist of two or more component lenses which may be cemented together.

SUMMARY OF THE INVENTION

In accordance with the present invention a further wide-angle objective of the same general optical design is provided. The objective of our present invention comprises in front of the diaphragm a negative lens element consisting of two negative component lenses and spaced therefrom a positive lens element consisting of two cemented component lenses which have inverse refractive power. Behind the diaphragm a negative lens element is arranged consisting of three negative component lenses of which the middle one is in itself a cemented lens.

BRIEF DESCRIPTION OF THE DRAWING

The FIGURE is an axial sectional view of the invented objective. The applied reference symbols refer to the lens radii, spacings and lens thicknesses given in the following example.

DESCRIPTION OF THE PREFERRED EMBODIMENT

The following example gives the data of the invented objective:

EXAMPLE

| | | $n_e$ | $v_e$ |
|---|---|---|---|
| $r_1=+1.670$ | | | |
| | $a_1=0.084$ | 1.58482 | 40.58 |
| $r_2=+0.817$ | | | |
| | $a_2=0.271$ | | |
| $r_3=+1.098$ | | | |
| | $a_3=0.063$ | 1.58482 | 40.58 |
| $r_4=+0.683$ | | | |
| | $a_4=0.616$ | | |
| $r_5=+0.640$ | | | |
| | $a_5=0.420$ | 1.74795 | 44.49 |
| $r_6=-1.098$ | | | |
| | $a_6=0.056$ | 1.76847 | 26.74 |
| $r_7=-26.766$ | | | |
| | $a_7=0.212$ [1] | | |
| $r_8=-0.371$ | | | |
| | $a_8=0.073$ | 1.56295 | 46.88 |
| $r_9=-0.438$ | | | |
| | $a_9=0.005$ | | |
| $r_{10}=-4.660$ | | | |
| | $a_{10}=0.161$ | 1.72340 | 50.17 |
| $r_{11}=-0.331$ | | | |
| | $a_{11}=0.051$ | 1.76847 | 26.74 |
| $r_{12}=-0.812$ | | | |
| | $a_{12}=0.121$ | | |
| $r_{13}=-0.397$ | | | |
| | $a_{13}=0.065$ | 1.56295 | 46.88 |
| $r_{14}=-0.677$ | | | |
| | $s'=0.7235$ | | |

[1] Diaphragm space.

It has been found that like objectives of good correction will be achieved if variations of the refractive power of the surfaces do not exceed the amount of $0.4 \cdot 1/f$ and also if the variations of the lens spacings remain inside a distance of $0.05f$. This is, of course, not to be understood in a sense that all parameters may vary at the same time in the same direction, but that the variation of one parameter in one direction inside the mentioned boundaries may be compensated for by the variation of one or more other parameter, which latter variations will then also remain inside the limits set forth above.

What is claimed is:

1. A photographic objective having a relatively long back focal distance with regard to its focal length and a great relative opening, of which objective the data of the lens radii, lens spacings and lens thicknesses have substantially the following specifications:

| | | $N_e$ | $v_e$ |
|---|---|---|---|
| $r_1=+1.670$ | | | |
| | $a_1=0.084$ | 1.58482 | 40.58 |
| $r_2=+0.817$ | | | |
| | $a_2=0.271$ | | |
| $r_3=+1.098$ | | | |
| | $a_3=0.063$ | 1.58482 | 40.58 |
| $r_4=+0.683$ | | | |
| | $a_4=0.616$ | | |
| $r_5=+0.640$ | | | |
| | $a_5=0.420$ | 1.74795 | 44.49 |
| $r_6=-1.098$ | | | |
| | $a_6=0.056$ | 1.76847 | 26.74 |
| $r_7=-26.766$ | | | |
| | $a_7=0.212$ [1] | | |
| $r_8=-0.371$ | | | |
| | $a_8=0.073$ | 1.56295 | 46.88 |
| $r_9=-0.438$ | | | |
| | $a_9=0.005$ | | |
| $r_{10}=-4.660$ | | | |
| | $a_{10}=0.161$ | 1.72340 | 50.17 |
| $r_{11}=-0.331$ | | | |
| | $a_{11}=0.051$ | 1.76847 | 26.74 |
| $r_{12}=-0.812$ | | | |
| | $a_{12}=0.121$ | | |
| $r_{13}=-0.397$ | | | |
| | $a_{13}=0.065$ | 1.56295 | 46.88 |
| $r_{14}=-0.677$ | | | |
| | $s'=0.7235$ | | |

[1] Diaphragm space.